March 19, 1940.  W. H. PEET  2,193,880

PUNCH PRESS CONTROL

Filed April 20, 1937  3 Sheets-Sheet 1

INVENTOR.
William H. Peet
BY
ATTORNEYS

March 19, 1940.  W. H. PEET  2,193,880
PUNCH PRESS CONTROL
Filed April 20, 1937  3 Sheets-Sheet 2

INVENTOR.
William H. Peet
BY Barnes, Kisselle, Laughlin & Raisch
ATTORNEYS

March 19, 1940.  W. H. PEET  2,193,880

PUNCH PRESS CONTROL

Filed April 20, 1937  3 Sheets-Sheet 3

INVENTOR.
William H. Peet
BY
ATTORNEYS

Patented Mar. 19, 1940

2,193,880

UNITED STATES PATENT OFFICE 2,193,880

PUNCH PRESS CONTROL

William Harold Peet, Detroit, Mich., assignor to General Motors Corporation, Detroit, Mich., a corporation of Delaware Application April 20, 1937, Serial No. 137,995

5 Claims. (Cl. 192—144)

This invention relates to heavy punch presses and has to do with an improved punch press control. The idea is to use fluid to throw the clutch and require several valves to be all closed before the press is started. These valves have to be held closed during a given part of the downward movement of the ram. After the dies have approached nearly together so that the operator's hand cannot be inserted between the dies, any one or all of the hand-operated valves can be released and the press continues its cycle of operations.

It is not new in punch presses to use a plurality of electric switches or valves in fluid lines all of which require operation to keep the press in operation. Nor is it broadly new to provide an arrangement wherein after the pressure members come together, the operator may release his hands from the valves. Such an arrangement has been used in a garment pressing machine. Most presses are provided with a one-revolution clutch, that is, a sliding pin clutch or a rotating key clutch which permits one revolution of the press only and then the clutch is automatically forced out. The present press control combines a very simple arrangement whereby all pin and key clutches are eliminated and an air-operated friction clutch is used which is controlled by a piece of apparatus that not only requires multiple valve operation but which is also arranged so that when a given part of the revolution has been made, the valves can be released to permit the operator to use his hands and when the cycle is completed, the clutch is automatically released. Both of these operations, to-wit: automatically holding the clutch in and automatically releasing the clutch are performed by a simple cam arrangement. In order to make the safety device nearly 100% efficient and also the one-revolution stop device nearly 100% efficient, an accumulator tank is used to afford the fluid pressure to release the clutch in place of the usual spring.

In order to make the release more instantaneous, a special exhaust valve is provided so that when the pressure in the line is reduced, the air that holds the clutch in engagement is instantly discharged.

Referring to the drawings.

Figure 1:
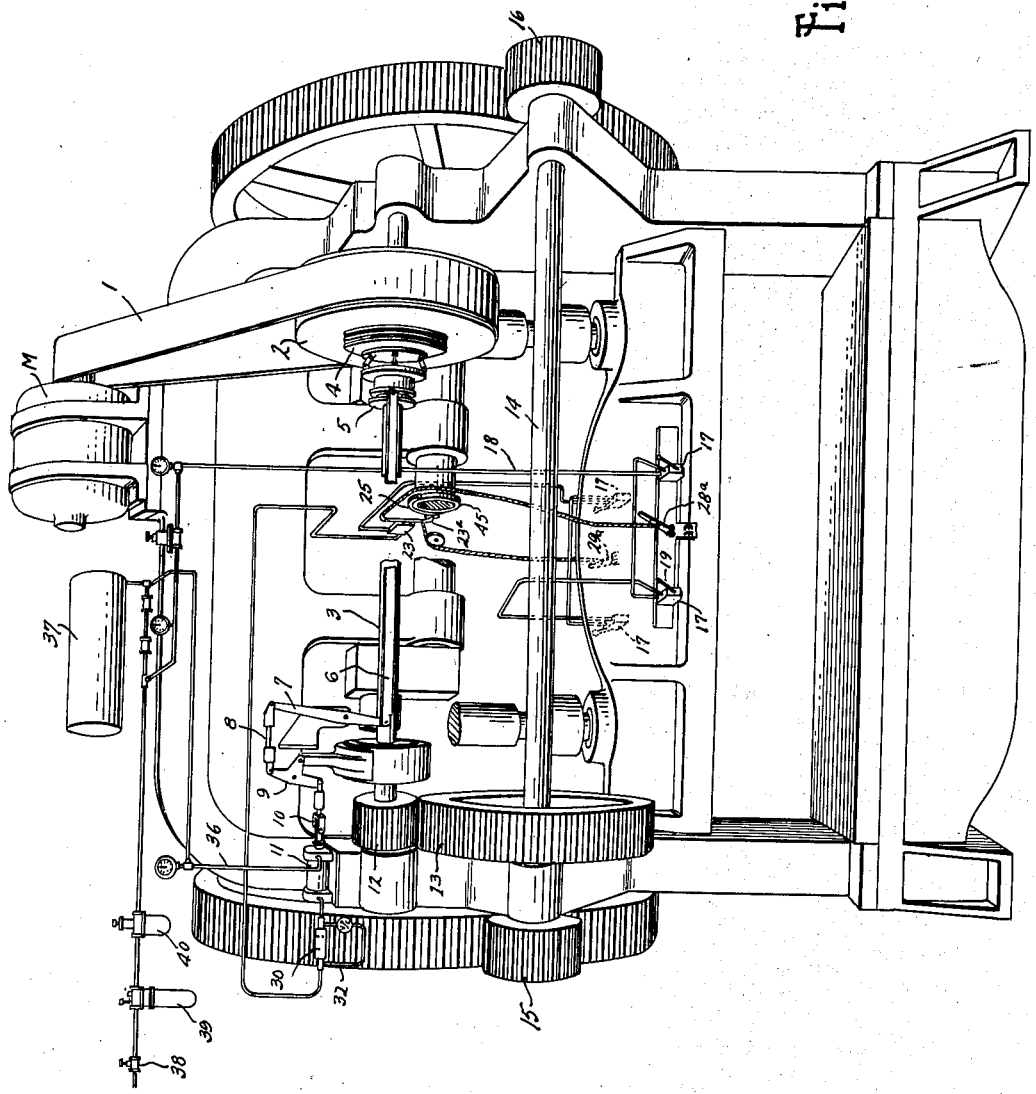
Fig. 1 is a perspective of a press equipped with the new control device.

The press here shown is a large, single acting press which is driven by an electric motor M. This drives through the belt 1 and the pulley 2, which runs loosely on the drive shaft 3 but which may be connected thereto by the disc clutch 4, the details of which need not be shown. This has a clutch collar 5 which is connected by linkage 6, 7, 8, 9 and 10 with a pneumatic cylinder 11. The drive shaft 3 has a driving pinion 12 which drives gear 13, shaft 14 and pinions 15 and 16. This tends to symmetrically deliver the driving effort to both ends of the heavy press.

Figure 2:
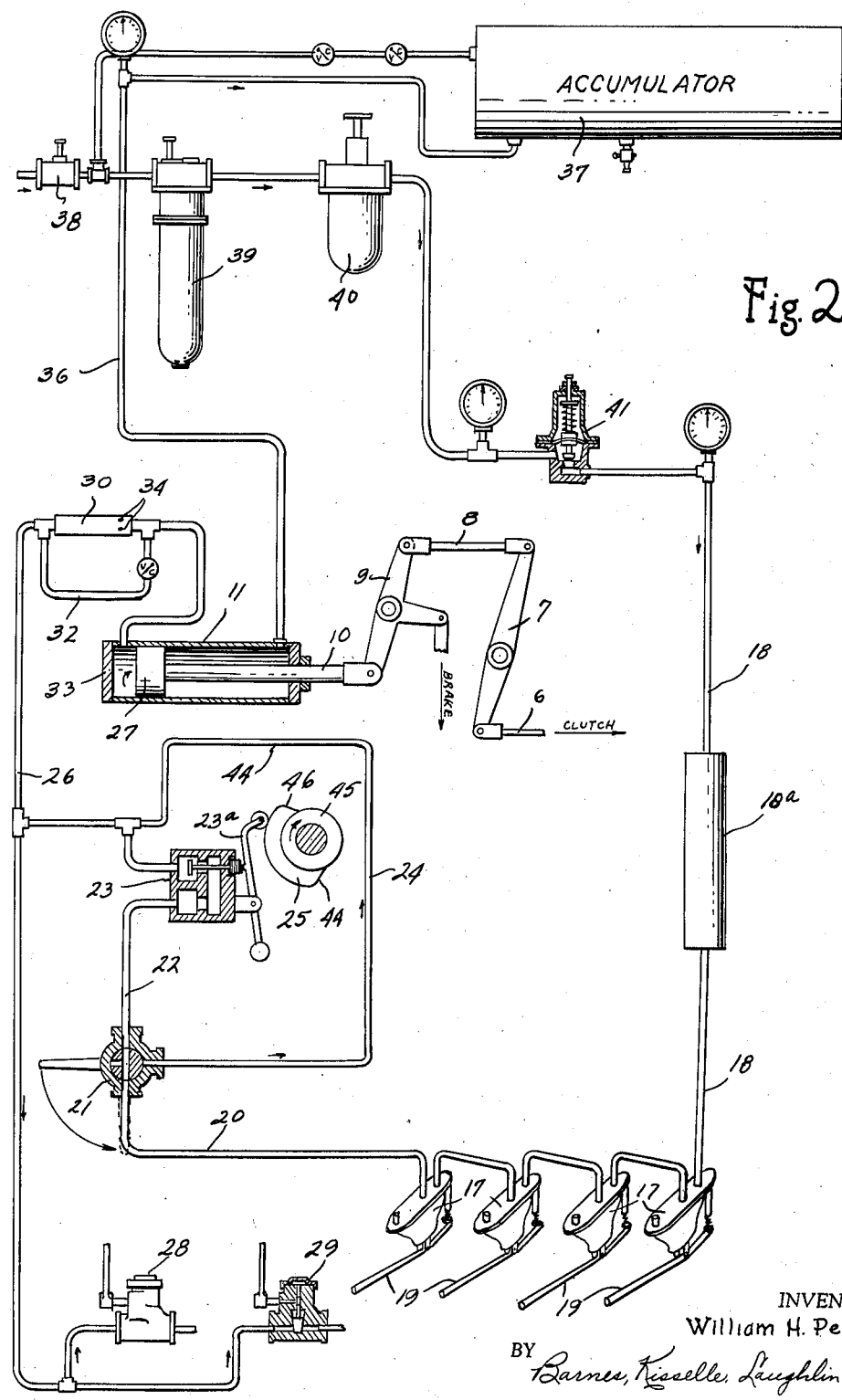
Fig. 2 is a diagrammatic view of the apparatus, in a modified form, interposing valves in place of cables, to allow minute control and emergency stopping of the press.

The control apparatus is afforded by a plurality of starting valves 17, known as three-way operating valves, two on each side of the machine as shown in Fig. 1. This requires the operator on both sides to utilize both hands. These starting valves, as shown in Fig. 2, are in series in the air supply line 18. The valves are normally open, but when the valve handle 19 is depressed, the opening to the atmosphere is closed and the air passes through the valve casing, without any diversion or leakage, and up through the pipe 20. 21 is a three-way cock of the usual character and which with the handle pointing as shown in Fig. 2, the air passes directly up through the pipe 22 to the pressure holding valve or pressure trapping valve 23. When the valve handle of valve 21 is turned downward through 90°, it cuts off the straight line through pipes 20 and 22 and routes the air around the by-pass line 24 to cut out the pressure holding valve 23. The pressure holding valve 23 is operated by the cam 25 which is adjustable to an indefinite number of settings and may be synchronized with the drive shaft. At a given point in the descent of the press, the cam 25 closes the valve 23 and traps air in the pipe 26, behind the piston 27, to hold the clutch 4 in engagement until the ram reaches top dead center.

Figure 4:
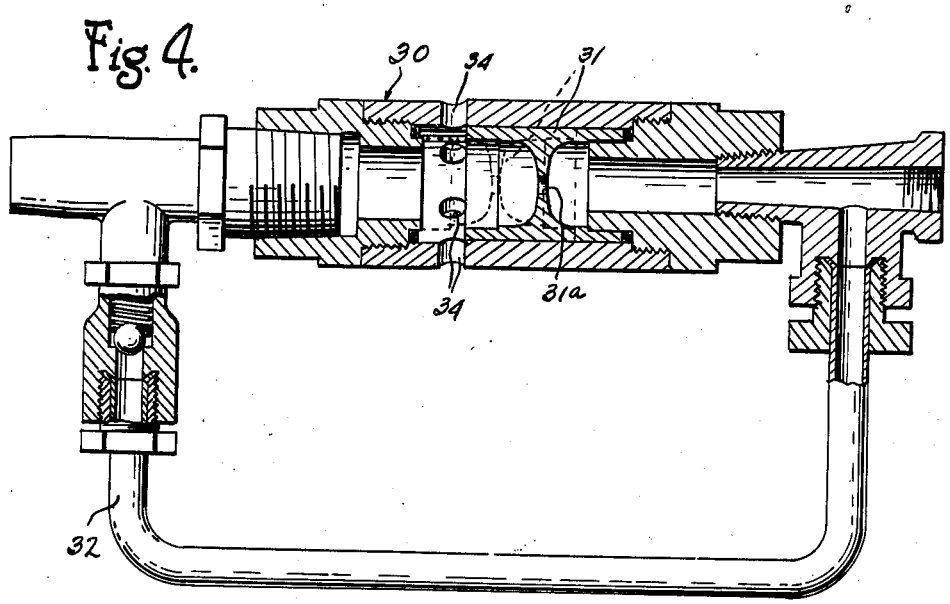
Fig. 4 is a detail of the automatic exhaust valve.

In Fig. 2, 28 and 29 are hand-operated relief valves, one on each side of the machine which may be used in case of emergency to stop the press even after the automatic holding arrangement has come into play by reason of the venting of the pressure line 26. In Fig. 1, the handles 28a and 29a are directly connected to the valve actuator 23a by cables such that they may be used as emergency stopping levers by reason of the tripping of the pressure holding valve 23. 30 is a quick discharge exhaust valve, a feature of this patent, operating by the reduction of the pressure in the air line. Ordinarily, the pressure keeps the shuttle 31 (Fig. 4) in the exhaust valve 30 in a position to close the discharge ports and the air is routed around through the by-pass 32. However, when one of the starting valves 17 or one of the emergency stop valves 28 or 29 is released and vents air at a remote point, this immediately reduces the supply pipe pressure and this in turn causes the pressure in the cylinder 33 to shift the shuttle 31 within the exhaust valve 30 and immediately vent the cylinder through the ports 34. This makes the piston 27 instantaneously responsive to remote action on any of the valves 17, 28 and 29 or of the levers 28a and 29a. The shuttle 31 is provided with a small orifice 31a which allows the pressure in cylinder 33 to bleed out in case the shuttle becomes stuck, thereby disengaging the clutch before a danger point is reached. It will be noted that the air in front of the piston is connected through pipe 36 with the accumulator tank 37 and this accumulator tank always provides pressure with which to return the piston 27 and release the clutch when either the operating valves or the emergency stop valves are released.

Figure 3:
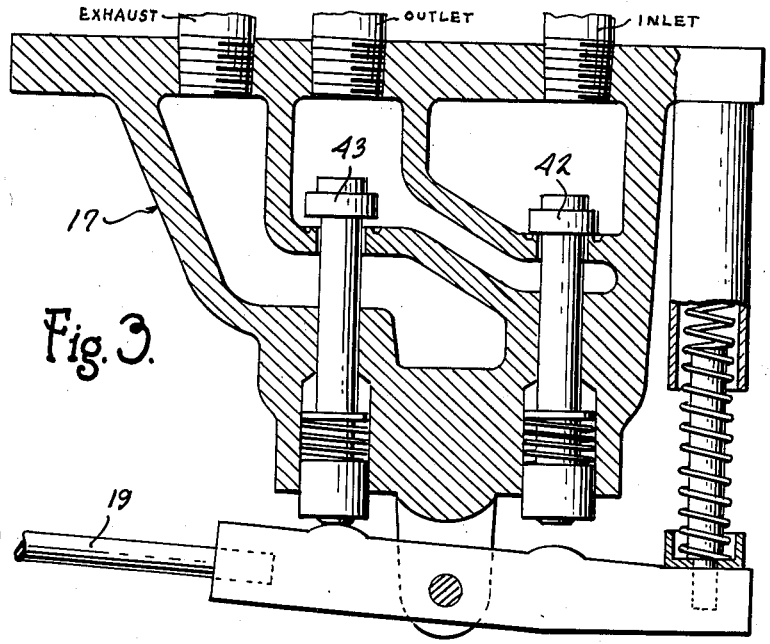
Fig. 3 is a section through the three way operating valve which may be of any standard make.

Operation: Air comes in through the gate valve 38, passes through filter 39 and lubricator 40, then down through the pressure relief valve 41 and thence through conduit 18. A storage tank 18a is provided in the conduit 18 for reducing air friction in the line when starting. The relief valve 41 is set to open at a pressure somewhat below line pressure yet sufficiently high to insure no air getting to the operating valves should the pressure in the line be below that which is considered safe for operating the brake effectively. If any one of the valve handles 19 is not depressed, the air coming from the supply is cut off from passing through this starting or operating valve. A section of this valve is shown in Fig. 3. The poppet intake valve 42 is closed and the poppet outlet valve 43 is normally open. It will be apparent that all these valves 17 must be depressed in order to let the air from pipe 18 into pipe 20. If any one of these valves is released, immediately the air is cut off in pipe 18 and the air in pipe 20 can exhaust back through the valve that is released. Hence in starting, all these valves must be held down on both sides of the machine. This lets the air through pipes 20, 22, valve 23, pipe 26 and by-pass 32 into the air cylinder 33. This pushes the piston 27 to the right, raising the pressure slightly in the accumulator tank by reason of the check valves preventing the air returning into the supply line, and at the same time operating the linkage and throwing in the clutch 4. The press now begins to revolve. At a given point, the cam 44 actuates the valve arm 23a and closes this valve. The air is therefore trapped behind the piston 27 and the clutch is held in, and any one of the valve handles 19 of the starting valves may now be released without releasing the clutch. The operator may now use his hands for any purpose desired such as reaching for another blank. If it should be decided to stop the press even after the automatic clutch holding device has gone into operation, either of the levers 28a and 29a may be operated. These will relieve the trapped pressure and as already explained, this reduces the pressure which, in turn, moves the shuttle 31 in the automatic exhaust valve 30 to get a quick discharge of air through the ports 34. It also is apparent that if at any time before the cam 44 is reached in the cycle of turning of the cam wheel 45, any one of the emergency valves 19 is released, the press is stopped at once. After the press is turned through slightly more than half a revolution, the arm 23a of the pressure holding valve encounters the cam 46 and this immediately opens the pressure holding valve and inasmuch as some of the valves 17 will be open, the press is immediately stopped, the automatic exhaust valve hastening the stoppage. If for any reason, it is desired to operate the press without the double cam control, this can be easily done by turning the handle of the three-way cock 21 to bring in the by-pass 24.

From the above description, it will be seen that this is not only the usual safety arrangement requiring operation of the air through a series of valves for starting the press, but coupled with this is an arrangement for the discontinuation of these safety starting valves when a given point in the cycle of operation has been reached without releasing the clutch. The cam and the same mechanism that locks the clutch in holding position serves at the second point in the cycle of operations to automatically release the press at the completion of one revolution doing away with the usual mechanical one-revolution clutches.

I claim:

1. In a press control of the type having a plural hand control and an automatic control for relieving the hand control after the danger point is passed, a means for safely actuating said press comprising a clutch, an air motor cylinder, a piston in said cylinder operably connected to said clutch, a compressed air supply connected to one end of said cylinder and adapted to move said piston to engage said clutch, an accumulator tank connected through a check valve to said air supply and connected to the other end of said cylinder to normally tend to disengage said clutch, a quick-acting exhaust valve between said cylinder and air supply comprising a housing having exhaust ports, a shuttle in said housing normally blocking the exhaust ports and provided with a bleeder opening, and a bypass around said quick-acting valve for normally supplying compressed air to said cylinder.

2. In a clutch control of the type wherein a fluid motor actuates a clutch, control means regulate the flow of fluid to said motor and wherein there is means to reduce the pressure in the fluid feed line at the cessation of engagement of the clutch; means for speedily exhausting the fluid from the fluid motor and allowing the clutch to return to its disengaged position, said means comprising a solid shuttle in the feed line normally covering a plurality of exhaust ports in said line, a by-pass around the solid shuttle, and a check valve in the by-pass, allowing passage of drive fluid but cutting off exhaust flow.

3. In a clutch control of the type wherein a fluid motor actuates a clutch, control means regulate the flow of fluid to said motor and wherein there is means to reduce the pressure in the fluid feed line at the cessation of drive of the clutch; means for speedily exhausting the fluid from the fluid motor, said means comprising a quick acting exhaust valve in the feed line between the motor and the pressure reducing means, comprising a housing having exhaust ports, a shuttle in said housing normally blocking the exhaust ports and provided with a bleeder opening, a by-pass around the shuttle, and a check valve in the by-pass allowing passage of the drive fluid, but cutting off exhaust flow.

4. The combination of a clutch, a fluid motor to actuate said clutch, a fluid feed line, control means to regulate the flow of fluid to said motor, valve means to reduce the drive pressure to said motor at the cessation of engagement of the clutch, means for speedily exhausting the fluid from the fluid motor, said means comprising a quick acting exhaust valve in the feed line, comprising a housing having exhaust ports, a shuttle in said housing normally blocking the exhaust ports and provided with a bleeder opening, a by-pass around the shuttle, and a check valve in the by-pass allowing passage of the drive fluid, but cutting off exhaust flow.

5. The combination of a driving machine, a driven machine, a clutch to operatively connect the driving and the driven machines, a fluid motor to actuate the clutch, means for biasing the fluid motor so that the clutch is disengaged, said means comprising a reservoir of fluid maintained at a pressure higher than the exhaust pressure of the fluid motor and lower than the drive pressure of the fluid motor, and connected to the non-working end of the fluid motor, a feed line to said motor, a valve control means to regulate the flow of fluid to said motor, trap valve means automatically operable at a given point in the movement of the driven machine for trapping fluid in said fluid motor to hold the clutch, notwithstanding the control means is released, and said trap valve means automatically operable at a given second point in the movement of the driven machine to automatically release the trapped fluid and allowing the clutch to return to its disengaged position, and means for speedily exhausting fluid from the fluid motor upon a drop in drive pressure allowing the clutch to return to its disengaged position, said means comprising a shuttle in the feed line having a relatively small passage therethrough, said shuttle normally covering a plurality of exhaust ports in the feed line, a by-pass around the shuttle, a check valve in the by-pass allowing passage of drive fluid, but cutting off exhaust flow.

WILLIAM HAROLD PEET.